United States Patent
Shelton et al.

(10) Patent No.: US 11,315,373 B2
(45) Date of Patent: Apr. 26, 2022

(54) DEVICE STORAGE ISOLATION

(71) Applicant: Hewlett-Packard Development Company, L.P., Spring, TX (US)

(72) Inventors: Gerold K. Shelton, Boise, ID (US); Matthew Frederickson, Boise, ID (US); Kyle J. Nottingham, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/481,474

(22) PCT Filed: Apr. 30, 2018

(86) PCT No.: PCT/US2018/030278
§ 371 (c)(1),
(2) Date: Jul. 28, 2019

(87) PCT Pub. No.: WO2019/212508
PCT Pub. Date: Nov. 7, 2019

(65) Prior Publication Data
US 2021/0327185 A1 Oct. 21, 2021

(51) Int. Cl.
*G07C 9/00* (2020.01)
*G07C 9/23* (2020.01)

(52) U.S. Cl.
CPC .......... *G07C 9/00912* (2013.01); *G07C 9/23* (2020.01); *G07C 2009/00761* (2013.01)

(58) Field of Classification Search
None
See application file for complete search history.

(56) References Cited

U.S. PATENT DOCUMENTS

| | | | |
|---|---|---|---|
| 6,314,169 B1 | 11/2001 | Schelberg, Jr. et al. |
| 8,235,247 B2 | 8/2012 | Alvarez |
| 8,806,275 B1 | 8/2014 | Vannatter et al. |
| 9,171,415 B2 | 10/2015 | Adams et al. |
| (Continued) | | | |

FOREIGN PATENT DOCUMENTS

CN 105162179 A * 12/2015

*Primary Examiner* — Fekadeselassie Girma
(74) *Attorney, Agent, or Firm* — HP Inc. Patent Department

(57) ABSTRACT

Examples associated with device storage isolation are described. One example apparatus includes a set of receptacles for electronic devices. Each receptacle includes a power connector to provide power to an electronic device stored in the receptacle, a network connector to provide a network connection to the electronic device stored in the receptacle, and a locking mechanism to secure contents of the receptacle. Members of the set of receptacles are digitally isolated from other members of the set of receptacles. The apparatus also includes an authentication module to authenticate a user based on a credential provided by the user. The authentication module controls a selected locking mechanism of a selected member of the set of receptacles based on the credential and based on data received from a remote information technology module. The apparatus also includes a user interface module to instruct the user through the process of storing a received electronic device in the receptacle or retrieving a provided electronic device from the receptacle.

12 Claims, 4 Drawing Sheets

(56) References Cited

U.S. PATENT DOCUMENTS

| | | |
|---|---|---|
| 9,452,884 B2* | 9/2016 | Rutledge ................ G06Q 10/20 |
| 2001/0037207 A1 | 11/2001 | Dejaeger |
| 2007/0125846 A1 | 6/2007 | Hemingway et al. |
| 2007/0247277 A1 | 10/2007 | Murchison et al. |
| 2010/0314405 A1 | 12/2010 | Alvarez |
| 2011/0060945 A1 | 3/2011 | Leprince et al. |
| 2011/0161227 A1 | 6/2011 | Santo, Jr. |
| 2012/0079100 A1 | 3/2012 | McIntyre et al. |
| 2012/0254345 A1 | 10/2012 | Montoya |
| 2013/0191236 A1* | 7/2013 | Bowles ................... G06Q 30/08 705/26.3 |
| 2013/0335027 A1 | 12/2013 | Jiang |
| 2015/0109941 A1* | 4/2015 | Zhang ................... H04W 88/02 370/252 |
| 2015/0269535 A1 | 9/2015 | Parris |
| 2015/0356801 A1* | 12/2015 | Nitu ....................... G07F 9/001 340/5.61 |
| 2016/0020625 A1* | 1/2016 | Tsou ..................... H02J 7/0044 320/115 |
| 2016/0300424 A1 | 10/2016 | Jones |
| 2016/0335616 A1 | 11/2016 | Bordeleau et al. |
| 2017/0069148 A1* | 3/2017 | Gilbertson ......... G07C 9/00857 |
| 2017/0104441 A1* | 4/2017 | Swan ...................... F24S 25/70 |
| 2020/0158318 A1* | 5/2020 | Paul ................... E05B 47/0002 |

\* cited by examiner

DEVICE STORAGE ISOLATION

BACKGROUND

Computing devices today have become a fundamental part of the way we live and work, as well as smaller and more mobile. Individuals, for example, use computers and mobile devices for entertainment, communication, shopping, and so forth. Further, businesses often provide computers for their employees so that the employees can efficiently carry out their duties across a wide variety of functions. While some businesses take on ownership and maintenance of devices provided to their users, other companies may opt to offload certain information technology costs using a variety of techniques. For example, some companies may rely on a device-as-a-service (DAAS) offering. A DAAS offering may involve periodic payments to a device provider in exchange for user devices and service guarantees for the hardware, software, and so forth, of the devices.

BRIEF DESCRIPTION OF THE DRAWINGS

The present application may be more fully appreciated in connection with the following detailed description taken in conjunction with the accompanying drawings.

DETAILED DESCRIPTION

Figure 1:
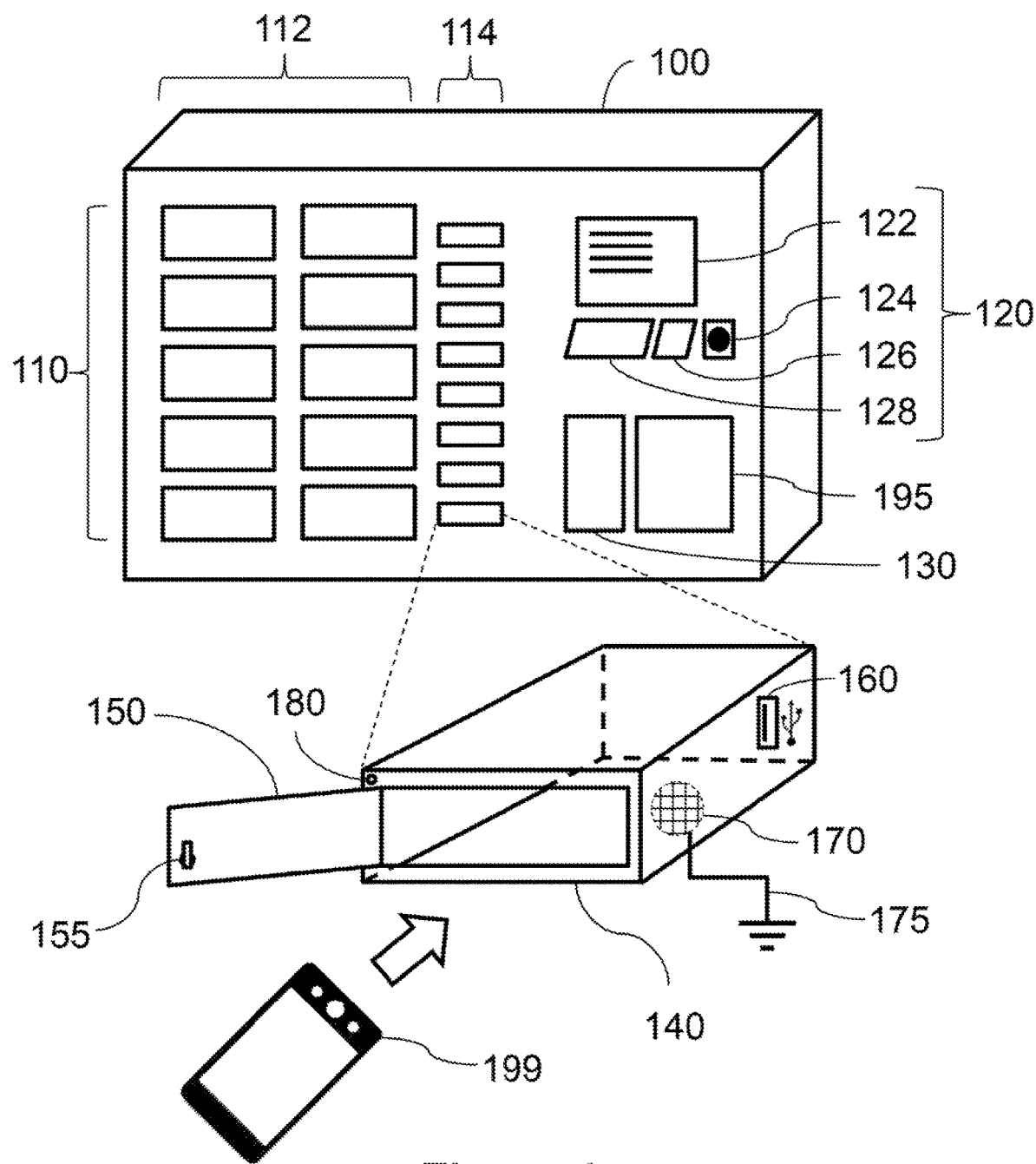
FIG. 1 illustrates an example service kiosk associated with device storage isolation.

Examples associated with device storage isolation are described. As will be more fully described herein, a service kiosk is an apparatus that is meant to store a set of devices for supporting a device-as-a-service model. The service kiosk includes a set of compartments each fitted with connectors to provide a connection between a device stored within the compartment and various control modules embedded in the service kiosk. The service kiosk may be physically installed in a location accessible to employees of a company relying on a device-as-a-service model to provide electronic devices to its employees. When service events associated with devices occur, the employees may visit the kiosk to have their device repaired by the kiosk and/or replaced by backup devices stored in the kiosk. This may increase the uptime of devices assigned to the employees. The backup devices may also reduce support costs associated with sending out technicians to provide support as a device failure can be at least temporarily mitigated by replacing the failed device with a new device in the kiosk, until eventually, a technician can be sent out to efficiently service or replace many devices stored in the kiosk in a single visit.

One potential risk of using a service kiosk to provide information technology support for a set of devices, is that the service kiosk itself may become a vector for attacking other devices in the service kiosk. A service kiosk that allows devices to directly communicate with one another over either wired or wireless connections may be particularly vulnerable. Consequently, the service kiosk may incorporate digital isolation techniques into the structure of the service kiosk itself to prevent devices from communicating with one another. The isolation may take a variety of forms including, for example, faraday cages to prevent wireless communication between a first device and other devices external to a compartment in which the first device is stored.

It is appreciated that, in the following description, numerous specific details are set forth to provide a thorough understanding of the examples. However, it is appreciated that the examples may be practiced without limitation to these specific details. In other instances, methods and structures may not be described in detail to avoid unnecessarily obscuring the description of the examples. Also, the examples may be used in combination with each other.

"Module", as used herein, includes but is not limited to hardware, firmware, software stored on a computer-readable medium or in execution on a machine, and/or combinations of each to perform a function(s) or an action(s), and/or to cause a function or action from another module, method, and/or system. A module may include a software controlled microprocessor, a discrete module, an analog circuit, a digital circuit, a programmed module device, a memory device containing instructions, and so on. Modules may include gates, combinations of gates, or other circuit components, Where multiple logical modules are described, it may be possible to incorporate the multiple logical modules into one physical module. Similarly, where a single logical module is described, it may be possible to distribute that single logical module between multiple physical modules.

As used herein, a service kiosk is intended to broadly describe a category of apparatuses used to securely store electronic devices in a manner that allows the devices to be configured while stored in the service kiosk. The service kiosk may have one or more compartments having data and/or power connectors. Devices that are attached to the data connectors may be configured either directly by the service kiosk or remotely by a remote service. Depending on where the devices are in their life cycle, the configuration may include setting up a device for a new user, modifying the device on behalf of a current user (e.g., reconfiguring the device, repairing the device), deprovisioning a device, and so forth. The service kiosk may also include an interface for communicating with and/or authenticating users. Once authenticated, the service kiosk may grant the user access to devices and or compartments to allow the user to perform a task related to a device assigned to the user. The task may involve obtaining a device from the kiosk, storing a device in the kiosk, and so forth. In various examples, the service kiosk may resemble, for example, a vending machine, a set of lockers, a chest of drawers, and so forth. Various structural components of a service kiosk may be made from wood, metal, plastic, or other suitable materials. The service kiosk may include structural elements such as legs, supports, wall fasteners, and so forth.

Consequently, the service kiosk may facilitate fulfilling service guarantees of a device-as-a-service (DAAS) offering. In a DAAS offering, a user or business may periodically pay a device provider for a device and a promise to service the device in the event the device fails. The service guarantee may include a variety of terms and in various examples may cover firmware, software, hardware, device data, user data, periodic lifecycle upgrades, and so forth. In this example, ownership of the device may remain with the device provider. In the event of a failure of the device or some other technical issue related to the device, a service kiosk stationed in a location accessible to the user may allow the device provider to more easily provide technical support for the device, up to and including replacing the device with a working device. For businesses that are relying on several devices at any given time, it may be cost effective for the business to have an on-site service kiosk to be able to quickly provision a new device for a new user, deprovision a device when that device's user leaves the business, and so forth, in addition to the technical support features that may be facilitated by the service kiosk itself. Eventually, when it is determined that the state of the devices in the service kiosk make it likely the service kiosk will begin failing to fulfil the service guarantee to the business (e.g., because the service kiosk is full, empty, has a number of devices in need of repair, or a combination of factors) a technician may be called to service the kiosk and/or devices stored within. This may be less expensive to the business and/or the device provider than having a technician on site, or having a technician called to service each malfunctioning device.

FIG. 1 illustrates an example service kiosk 100 associated with device storage isolation. Service kiosk 100 includes a set of receptacles 110. While 18 receptacles are shown, in other examples, service kiosk 100 may include a greater or lesser number of receptacles. The receptacles 110 may be adapted for storing electronic devices 199. Different receptacles may be adapted to store different types of electronic devices 199. Here for example, receptacles 112 may be adapted to store a first type of device (e.g., laptops), and receptacles 114 may be adapted to store a second type of device (e.g., cell phones), In other examples, receptacles may be configured to store different types, models, and/or brands of laptops, phones, tablets, or other device types. Receptacles 110 may be adapted to store different types of devices based on a variety of attributes. For example, receptacles 110 for storing phones may be smaller than receptacles 110 for storing laptops.

One receptacle 140 is illustrated in additional detail to further illustrate features of receptacles 110. In this example, receptacle 140 is adapted for storing cellular phones 199. This may affect the size of receptacle 140, connectors 160 installed in receptacle 140, and so forth, Here, receptacle 140 is shown as having a universal serial bus (USB) connector 160. USB connector 160 may provide power to device 199 as well a data connection between device 199 and other components of service kiosk 100. For laptops, receptacles 110 may use a different configuration of connectors 160 for providing power and/or data to a device 199. For example, a regional power adaptor may be used for providing power to devices. The data connection for a laptop may be provided using, for example, an ethernet port, a universal serial bus port, or other types of ports.

It is also worth observing that in other examples, connector 160 may take different physical forms. Here, connector 160 is illustrated as a USB port in the rear wall of receptacle 140. This may mean that to connect device 199 to connector 160, an appropriate cable would also need to be provided. In other examples, connectors 160 may be cables or retractable cables of the appropriate type for connecting to a device type for which receptacle 140 is configured, a docking port of the appropriate type for connecting to a device type for which receptacle 140 is configured, a wireless communication transmitter (e.g., WIFI, Bluetooth) and so forth. The different connector types may have different tradeoffs. For example, a USB port as illustrated may ensure that a device appropriate cable is provided to a user who obtains a device from receptacle 140, but would also mean that a user inserting a device 199 would have to bring or be provided such a cable. Alternatively, a connector that involves an installed cable or docking port may ensure that a person inserting a device into receptacle 140 would be able to insert the device without providing an additional cable, but would mean that a user retrieving a device from receptacle 140 would have to be provided an appropriate cable through an alternative method.

Receptacle 140 also includes a locking mechanism 155. In this example, locking mechanism 155 is illustrated as being attached to a door 150 of receptacle 140. However, locking mechanism 155 may take a variety of forms and its form may depend on the form by which door 150 is designed to give access to users. Here for example, door 150 is illustrated as opening outwards, though in other examples, a sliding, rotating, or retracting door may be appropriate. Locking mechanism 155 may be controllable by other components of service kiosk 100 to grant and restrict access to receptacle 140. These other components and the situations in which access to receptacle 140 may be controlled are more fully discussed below. In some examples, it may also be desirable for locking mechanism 155 to be controllable via a physical mechanism (e.g., a service key). This may allow receptacle 140 to be serviced by a technician to, for example, modify the contents of receptacle 140, repair a component of receptacle 140, and so forth, even when service kiosk 100 is unpowered.

In this example, receptacle 140 is illustrated as incorporating a digital isolator 170. Here, digital isolator 170 is illustrated as a faraday cage 170 that is built into the structure of receptacle 140. Faraday cage 170 may prevent wireless electronic signals from being transmitted by device 199 to devices external to receptacle 140, as well as preventing device 199 from receiving wireless signals from devices external to receptacle 140, In this example, faraday cage 140 is illustrated as being grounded 175, though in other examples, the ground may be excluded. Other digital isolation techniques may also be employed. For example, digital isolation may also be achieved via the port 160 providing a data connection between device 199 and other components of service kiosk 100, By way of illustration service kiosk 100 may implement individualized networks to prevent direct transmission of wired signals between devices in members of the set of receptacles 110. This may also prevent devices 199 from detecting whether other devices are connected to service kiosk 100. Digital isolation may also include signal isolation to ensure secure communication between devices in the receptacles 110 and other components of service kiosk 100. In some examples, digital isolation may also incorporate power isolation.

Service kiosk 100 also includes an interface 120. Interface 120 may include several components. Here interface 120 includes a display 122, a keyboard 128, a keypad 126, and a radio frequency identification (RFID) scanner 124. Interface 120 may use these components to facilitate communicating with user interacting with service kiosk 100. Interface 120 may also include additional components including for example, cameras, touch input devices, external device connectors (e.g., to provide power and/or data to devices not in receptacles 110), and so forth. Interface 120 may also make use of lights 180 associated with individual receptacles 110. These lights 180 may allow the interface to direct a user to a specific receptacle 110 of service kiosk 100. For example, when service kiosk 100 seeks to direct a user to a specific receptacle 110, service kiosk 100 may control a light on that receptacle to turn on, blink, and so forth.

Service kiosk 100 may also include a variety of modules 130 for performing various functions associated with service kiosk 100 and/or configuring devices 199 stored in compartments 110 of service kiosk 100. Modules 130 may be, for example, performed by a processor of a computer embedded in service kiosk 130. In other examples, modules 130 may act as a communication pass through for communications between a remote information technology module (e.g., a device-as-a-service operation) and devices 199 stored in compartments 110 of service kiosk 100.

In various examples, the modules 130 may interact with a user via interface 120, with devices 199 in compartments 110, with other modules 130, and with remote servers and/or devices. For example, modules 130 may include an authentication module. The authentication module may receive a credential from a user and authenticate the credential based on authentication data associated with the user. The authentication data may have been received from a remote information technology module. When the user is successfully authenticated, the authentication module or another module 130 of service kiosk 100 may grant the user access to one or more receptacles 110 of service kiosk 100. The user may provide the credential via user interface 120. The credential may be, for example, a username and password pair that identifies the user that the user inputs via keyboard 128. In another example, the credential may be an RFID signal the user provides via RFID scanner 124. In another example, the user may authenticate themselves by attaching the mobile device 199 to a data connector of service kiosk 100. Multifactor authentication may also be appropriate involving a combination of the above and/or other authentication techniques.

In various examples, service kiosk 100 may be selective about granting user access to receptacles 110. How service kiosk 100 determines which receptacles 110 to which a user is granted access may depend on what function service kiosk 100 is performing for the user. In various examples, the user may be picking up a device from service kiosk 100, storing a device in service kiosk 100, having a device repaired or configured by service kiosk 100, diagnosing a technical issue with a device with the help of service kiosk 100, and so forth. In these examples, service kiosk 100 may grant such a user access only to receptacles associated with the task being performed by service kiosk 100. The user may be granted access to these receptacles 110 by service kiosk 100 controlling locking mechanisms 155 on the respective receptacles 110. In cases where the user is a technician responsible for servicing service kiosk 100, the user may be granted access to specific receptacles, or in some cases general access to all receptacles 110. This may allow the technician to adjust the contents of the receptacles and/or perform physical maintenance on devices stored within service kiosk 100 or on service kiosk 100 itself.

Service kiosk 100 may also include a variety of other components 195. For example, component 195 may be a compartment storing additional supplies that support the purpose of service kiosk 100. By way of illustration, component 195 may store spare parts, extra data and/or power cables, and so forth that may be used by users interacting with service kiosk 100. In other examples, component 195 may also store, for example, packaging and mailing supplies for shipping devices 199 for service, Other potential components 195 may also be contemplated.

Figure 2:
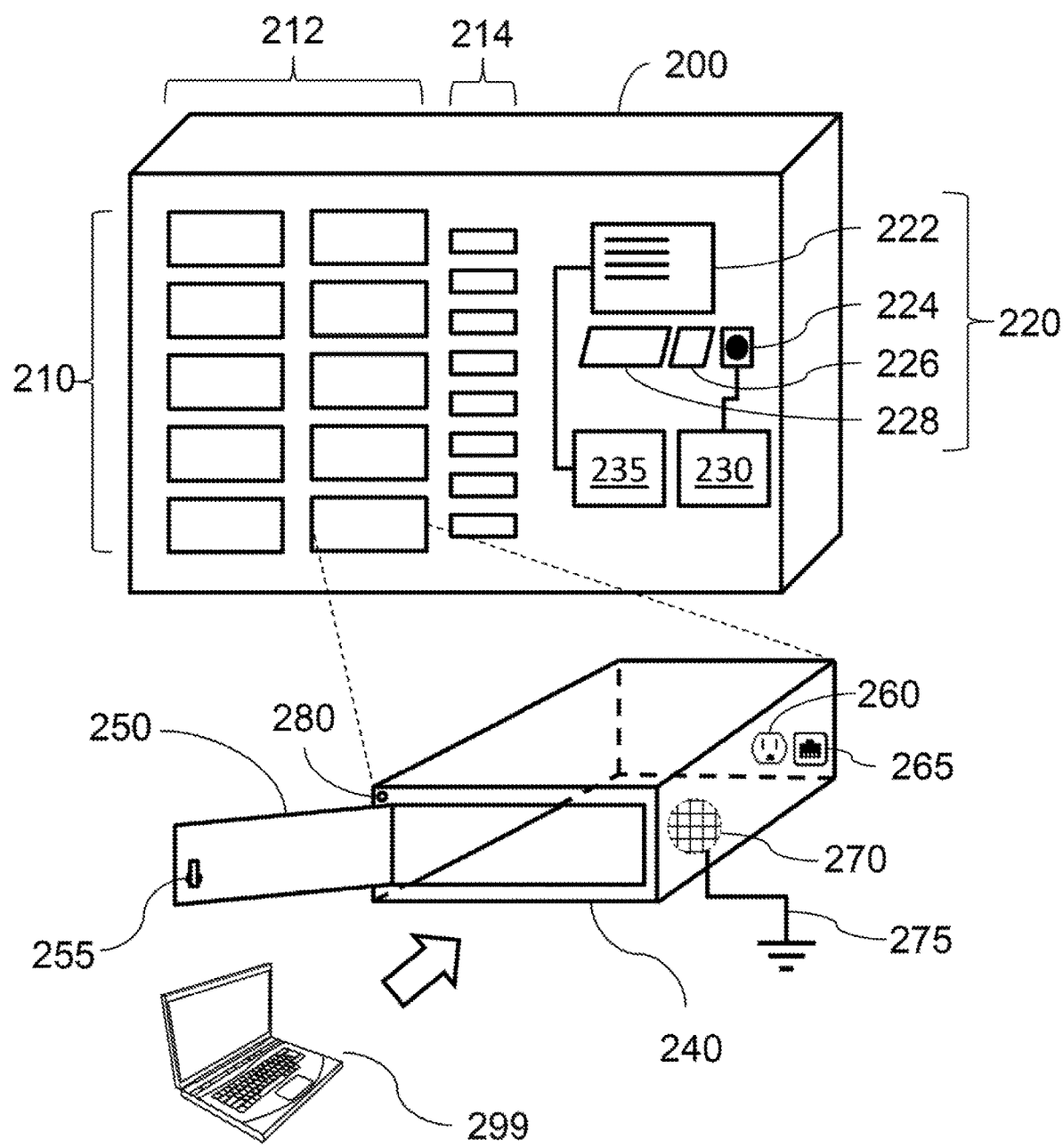
FIG. 2 illustrates another example service kiosk associated with device storage isolation.

FIG. 2 illustrates an example service kiosk 200 associated with device storage isolation. Service kiosk 200 includes a set of receptacles 210 for electronic devices (e.g., electronic device 299). An example receptacle 240 is illustrated in additional detail, Each member of the set of receptacles 210 includes a power connector 260 for providing power to an electronic device (e.g., electronic device 299) stored in the receptacle. Here power connector 260 is illustrated as being an alternating current power adaptor from North America.

Each member of the set of receptacles 210 also includes a data connector 265 to provide a data connection to the electronic device stored in the receptacle. Here data connector 265 is illustrated as being an Ethernet adaptor. Different receptacles may have different configurations. In this example, service kiosk 200 includes some receptacles 212 having a first size, and other receptacles 214 having a different size. The different sizes may correspond to different types of devices (e.g., laptops, cellphones, tablets) intended for storage in the receptacles. Further, depending on the type of device for which each receptacle is configured, different power connectors and data connectors may be appropriate. By way of illustration, the power connector and the data connector for certain devices may cohabit a single physical connector (e.g., USB-C, Lightning). Regional differences for the adaptors may also be appropriate depending on the geographic region in which service kiosk 200 is physically located. Other attributes of the receptacles may also vary.

Each member of the set of receptacles 210 also includes a locking mechanism 255. Locking mechanism 255 may secure contents of the receptacle 240. Here, locking mechanism 255 is illustrated as being attached to door 250 of example receptacle 240. In other examples alternative locking mechanisms may be appropriate. By way of illustration, the locking mechanism could be built into the structure of receptacle 240, the door 250, a combination of components, and so forth. Members of the set of receptacles 210 may be digitally isolated from other members of the set of receptacles 210. Digital isolation may take a variety of forms. In this example receptacle 240 is illustrated as having a faraday cage 270 attached to a ground 270 built into the structure of receptacle 240. Faraday cage 270 may prevent wireless transmissions between devices in members of the set of receptacles 210. In other examples, digital isolation may include individualized networks to prevent direct transmission of wired signals between devices in members of the set of receptacles 210, Digital isolation may also include signal isolation to ensure secure communication between devices in the receptacles 210 and modules embedded in service kiosk 200. These modules may include, for example, provisioning modules, deprovisioning modules, repair modules, diagnostic modules, and so forth. Thus, to facilitate digital isolation between receptacles 210, service kiosk 200 may include wiring and/or networking components that ensure that devices 299 stored in receptacles 210 and connected to service kiosk 200 via adaptors 265 can communicate with components of service kiosk 200 but not with one another. These networking components may include for example, hardware and/or software components such as routers, switches, network address translation software, and so forth.

Service kiosk 200 also includes an authentication module 230. Authentication module 230 may authenticate a user based on a credential provided by the user. When the user is authenticated, authentication module may control a selected locking mechanism (e.g., locking mechanism 255) of a selected member (e.g., receptacle 240) of the set of receptacles 210. Authentication module 230 may control selected locking mechanism 255 based on the credential and based on data received from a remote information technology module. The credential received by authentication module 230 may depend on other components to which authentication 230 is connected and is capable of receiving inputs from. By way of illustration the credential may be a user name and password received via a keyboard 228, a radio-frequency identifier received via a radio-frequency identification scanner 224, a credential received from a device connected to service kiosk 200, and so forth.

Service kiosk 200 also includes a user interface module 235. User interface module may instruct the user through the process of storing a received electronic device in selected receptacle 240, retrieving a provided electronic device from selected receptacle 240, and so forth. In some example, user interface module 235 may communicate with the user via a user interface 220. Here, user interface 220 is illustrated as having several components including a display 222, a keyboard 226, a numpad 228, and a radio frequency identification (RFID) scanner 226. As discussed above, in some examples, authentication module 230 may scan a badge bellowing to the user. The badge may be scanned using a RFID scanner 224. The badge may be provided by an employer of the user to authenticate the user to corporate assets of the user. Authenticating the user to the corporate assets may allow service kiosk 200 to load profiles associated with the user, devices in possession of the user, and so forth to better facilitate providing service to the user and/or devices in their possession. The user interface may perform a secondary authentication function (e.g., ask for a password) to achieve multi-factor authentication. The user interface 220 may also include components associated with individual receptacles 210. For example, light 280 may facilitate indicating to a user which receptacle the user should attempt to access. Other user interface configurations may also be appropriate.

Figure 3:
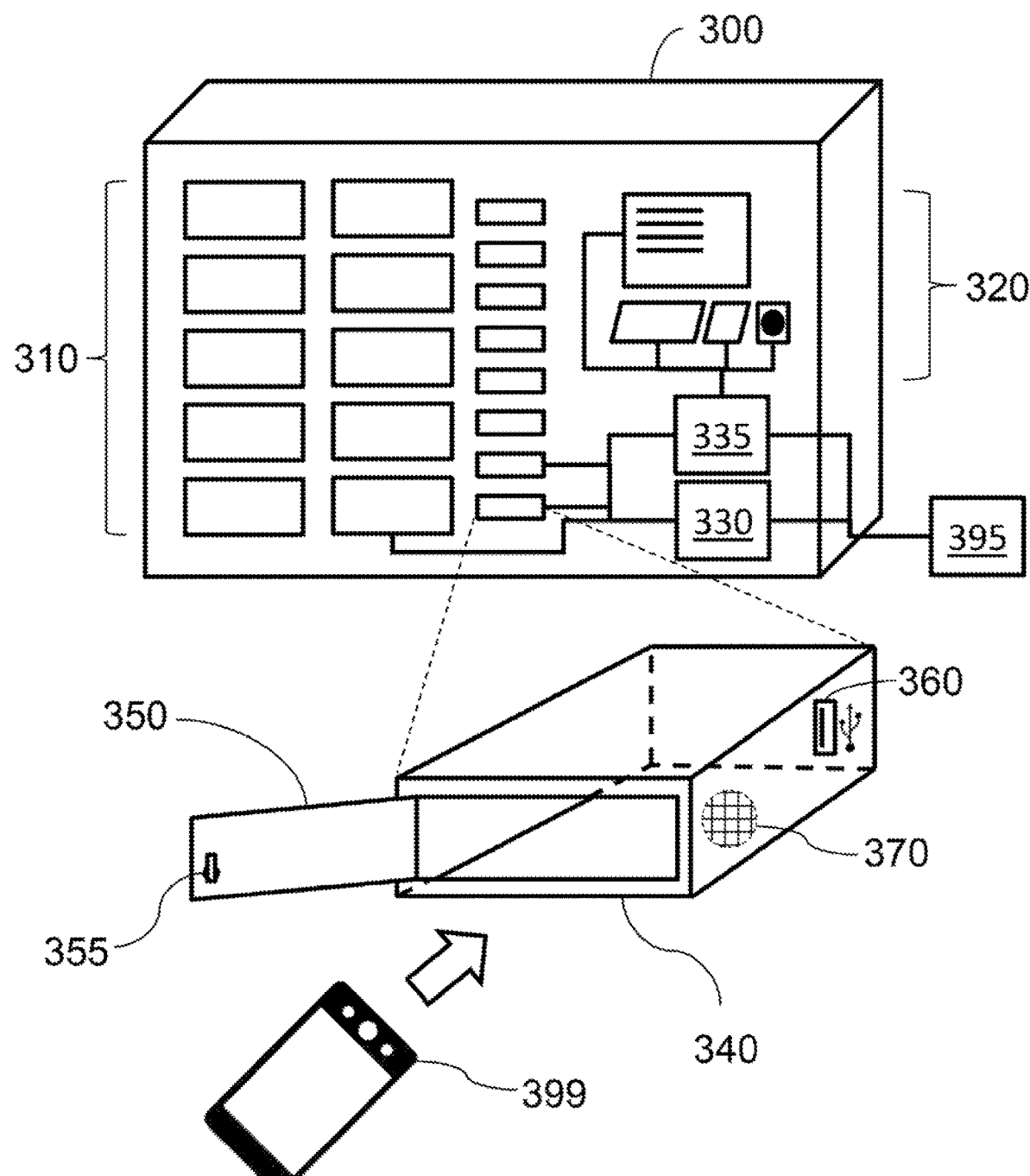
FIG. 3 illustrates an example system associated with device storage isolation.

FIG. 3 illustrates a system 300. System 300 includes a control module 330. Control module 300 may control configuration of electronic devices stored within system 300. Configuration of the electronic devices may include, for example, provisioning the devices, repairing the devices, deprovisioning the devices, and so forth.

System 300 also includes a set of receptacles 310. An example receptacle 340 is illustrated in additional detail. Members of the set of receptacles 310 may be adapted to store electronic devices (e.g., electronic device 399). Each receptacle may include, for example, an adaptor 360 for providing power to electronic device 399, a data connection between electronic device 399 and control module 330, and so forth. Here, adaptor 360 is illustrated as being a universal serial bus (USB) port, though other adaptors may be appropriate depending on the type of device receptacle 340 is adapted to store. Each receptacle 310 also includes a locking mechanism 355 to secure the contents of the receptacle. Here, locking mechanism 355 may prevent door 350 from opening when door 350 is closed and locking mechanism 355 is turned. Each receptacle 310 may also include a digital isolator (e.g., faraday cage 370). The digital isolator may electrically isolate the electronic device from devices stored in other receptacles 310.

System 300 also includes an interface 320 to receive input from a user. Interface 320 may include, for example, a display, a keyboard, a keypad, a RFID scanner, and so forth. Interface 320 may facilitate authenticating a user, allowing the user to communicate with system 300 and its components, remote information technology assets connected to system 300 over a network, information technology administrators, and so forth.

System 300 also includes an authentication module 335. Authentication module 335 may authenticate a user based on a credential provided by the user via interface 320, Authentication module 335 may also control a selected locking mechanism of a selected member of the set of receptacles based on the credential, and based on data received from a remote information technology module 395. The data received from the remote information technology module may be used by control module 330 to configure a device 399 associated with the selected member of the set of receptacles. This device 399 may be retrieved from the receptacle by the user.

Figure 4:
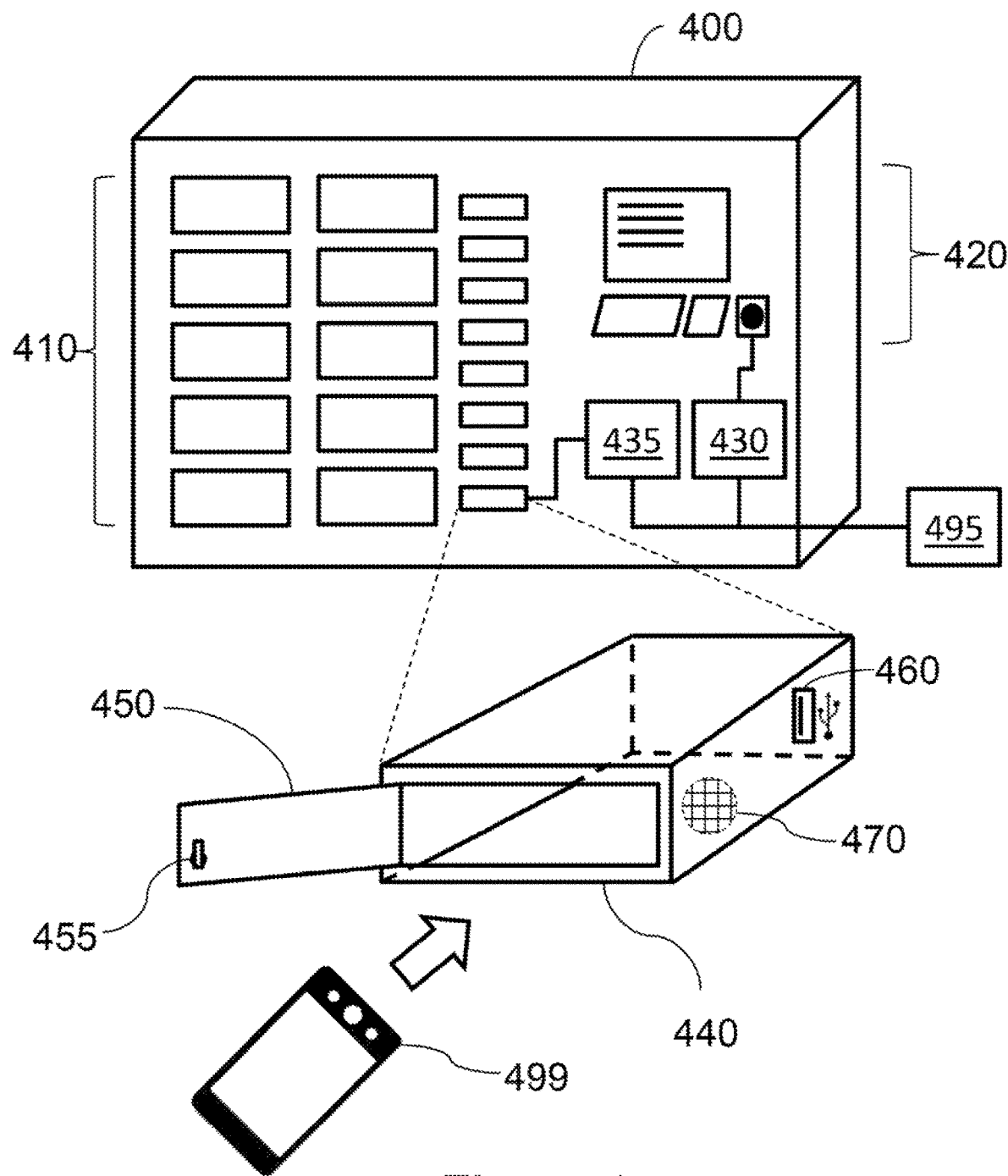
FIG. 4 illustrates an example apparatus associated with device storage isolation.

FIG. 4 illustrates an apparatus 400. Apparatus 400 includes a set of receptacles 410. An example receptacle 440 is illustrated in additional detail, Each receptacle 410 may include a power source to provide power to a stored electronic device 499 and a data connection to provide a data connection between stored electronic device 499 and components of apparatus 400. Here the power source and data connection are both illustrated as being a part of USB port 460.

Each receptacle 410 may also include a locking mechanism 455 (e.g., built onto door 450) to physically secure stored electronic device 499 within the receptacle. Each receptacle 410 may also include a digital isolator to prevent communication between stored electronic device 499 and other electronic devices. While a faraday cage 470 is illustrated here, the digital isolator may also be an individualized network, a signal isolator, or some other type of isolator.

Apparatus 400 also includes an interface 420 to communicate with a user. The user may use interface 420 to communicate with an authentication module 430. For example, the user may provide a credential to authentication module 420 via interface 420. Upon authenticating the user, authentication module 430 may provide access to a selected member (e.g., receptacle 440) of the set of receptacles 410. Access may be provided by controlling a selected locking mechanism 455 of selected receptacle 440, In some examples, authentication module 440 may provide access based on the credential and based on data received from a remote information technology module 495.

Apparatus 400 also includes a device-as-a-service (DAAS) module 435. DAAS module 435 may use data received from the remote information technology module 495 to pre-configure an electronic device (e.g., electronic device 499) stored within the selected member of the set of receptacles. Preconfiguring the device may involve loading data, applications, and so forth as identified by the remote information technology module onto the device. This may prepare the device for a user who will eventually pick up the device from apparatus 400 so that the user can quickly begin using the device.

It is appreciated that the previous description of the disclosed examples is provided to enable any person skilled in the art to make or use the present disclosure, Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:
1. A kiosk, comprising:
 a set of receptacles for electronic devices, each receptacle comprising:
  a power connector to provide power to an electronic device stored in the receptacle;
  a data connector to provide a data connection to the electronic device stored in the receptacle;
  a door; and
  a locking mechanism coupled to the door to secure contents of the receptacle;

a faraday cage to prevent wireless communication between an electronic device, when present, and other electronic devices external to the receptacle; and an adaptor to permit wired communication between the electronic device and a control module of the kiosk but not permit communication with other members of the set of receptacles;

an authentication module to authenticate a user based on a credential provided by the user, to control, based on the credential and based on data received from a remote information technology module, a selected locking mechanism of a selected member of the set of receptacles; and a user interface module to instruct the user through the process of at least one of storing a received electronic device in the selected receptacle, and retrieving a provided electronic device from the selected receptacle.

2. The kiosk of claim 1, where a first receptacle has a first set of attributes associated with a first device type, and where a second receptacle has a second set of attributes associated with a second device type.

3. The kiosk of claim 2, where the attributes include at least one of, a size of the receptacle, a power connector type, and a data connector type.

4. The kiosk of claim 1, where the first device type is a laptop and where the second device type is a cellular phone.

5. The kiosk of claim 1, where the power connector and the data connector cohabit a single physical connector.

6. The kiosk of claim 5, where the single physical connector is one of a USB-C connector, and a Lightning connector.

7. The kiosk of claim 1, where the members of the set of receptacles are digitally isolated from one another using signal isolation to ensure secure communication between at least one device in a member of the set of receptacles and a module embedded in the kiosk.

8. The kiosk of claim 7, where the module embedded in the kiosk is one of: a provisioning module, a deprovisioning module, a repair module, and a diagnostic module.

9. The kiosk of claim 1, where the authentication module scans a badge belonging to the user, the badge provided by an employer of the user to authenticate the user to corporate assets of the employer, and where the user interface performs a secondary authentication function to achieve multi-factor authentication.

10. A kiosk, comprising:
a control module to control configuration of electronic devices stored within the kiosk;
a set of receptacles adapted to store the electronic devices, each receptacle comprising:
an adaptor for providing at least one of power to an electronic device, and a wired data connection between the electronic device and the control module;
a door;
a locking mechanism coupled to the door to secure contents of the receptacle; and
a faraday cage to prevent wireless transmission between an electronic device, when present, and other electronic device external to the receptacle;
an interface to receive input from a user; and
an authentication module to authenticate a user based on a credential provided by the user via the interface, to control a selected locking mechanism of a selected member of the set of receptacles based on the credential, and based on data received from a remote information technology module, and where the data received from the remote information technology module is used by the control module to configure a device associated with the selected member of the set of receptacles.

11. The kiosk of claim 10, where the device associated with the selected member of the set of receptacles is retrieved from the receptacle by the user.

12. A kiosk, comprising:
a set of receptacles adapted to store electronic devices, where each receptacle comprises:
a power source to provide power to a stored electronic device;
a data connection to provide a wired data connection between the stored electronic device and components of the kiosk;
a door;
a locking mechanism coupled to the door to physically secure the stored electronic device within the receptacle; and
a faraday cage to prevent wireless transmission between an electronic device, when present, and other electronic device external to the receptacle;
an interface to communicate with a user; and
an authentication module to authenticate a user based on a credential provided by the user via the interface, to provide access to a selected member of the set of receptacles by controlling a selected locking mechanism of the selected member of the set of receptacles based on the credential, and based on data received from a remote information technology module; and
a device-as-a-service module to use the data received from the remote information technology module to pre-configure an electronic device stored within the selected member of the set of receptacles.

* * * * *